US012697529B2

(12) United States Patent
Cruz

(10) Patent No.: US 12,697,529 B2
(45) Date of Patent: Aug. 4, 2026

(54) SPORTS DRONE SYSTEM AND METHOD OF USE

(71) Applicant: Fred Cruz, Brownsburg, IN (US)

(72) Inventor: Fred Cruz, Brownsburg, IN (US)

( * ) Notice: Subject to any disclaimer, the term of this patent is extended or adjusted under 35 U.S.C. 154(b) by 169 days.

(21) Appl. No.: 18/359,231

(22) Filed: Jul. 26, 2023

(65) Prior Publication Data

US 2024/0245954 A1     Jul. 25, 2024

Related U.S. Application Data

(60) Provisional application No. 63/440,509, filed on Jan. 23, 2023.

(51) Int. Cl.

| | |
|---|---|
| *A63B 24/00* | (2006.01) |
| *A63B 71/06* | (2006.01) |
| *A63B 102/32* | (2015.01) |
| *B60L 53/14* | (2019.01) |
| *B64F 1/36* | (2024.01) |
| *B64U 10/14* | (2023.01) |
| *B64U 70/93* | (2023.01) |
| *B64U 101/20* | (2023.01) |
| *B64U 101/30* | (2023.01) |

(52) U.S. Cl.
CPC ...... *A63B 24/0062* (2013.01); *A63B 24/0003* (2013.01); *A63B 71/0622* (2013.01); *B60L 53/14* (2019.02); *B64F 1/362* (2013.01); *B64U 10/14* (2023.01); *B64U 70/93* (2023.01); *A63B 2024/0028* (2013.01); *A63B 2102/32* (2015.10); *A63B 2220/806* (2013.01); *B60L 2200/10* (2013.01); *B64U 2101/20* (2023.01);

*B64U 2101/30* (2023.01); *B64U 2201/10* (2023.01); *B64U 2201/20* (2023.01)

(58) Field of Classification Search
CPC ............ A63B 24/0062; A63B 24/0003; A63B 71/0622; A63B 2024/0028; A63B 2102/32; A63B 2220/806; A63B 57/00; B60L 53/14; B60L 2200/10; B64F 1/362; B64U 10/14; B64U 70/93; B64U 2101/20; B64U 2101/30; B64U 2201/10; B64U 2201/20
See application file for complete search history.

(56) References Cited

U.S. PATENT DOCUMENTS

| | | |
|---|---|---|
| 9,782,648 B2 | 10/2017 | DeCarlo |
| 10,286,330 B2 | 5/2019 | Yatsko |
| 10,836,508 B2 | 11/2020 | Overall |

(Continued)

*Primary Examiner* — Alan D Hutchinson
(74) *Attorney, Agent, or Firm* — Brennan, Manna & Diamond, LLC

(57) ABSTRACT

A golfer and golf course drone monitoring system. The system includes a golf drone designed to follow golfers during play and be wirelessly connected to mobile devices through a mobile application. The drone is positioned on a golf cart and autonomously activated when golfers move away from a golf cart. The drone includes a plurality of cameras with integrated computer vision algorithms for capturing swing mechanics of a golfer and important scoring events in a game. The videos are transmitted to the mobile application wherein the golfer can view captured videos, receive swing insights, and can also remotely control the drone's functions. The drone is designed to position on a charging station on the top of, or roof of, the golf cart between shots or swings for recharging the battery thereof.

19 Claims, 10 Drawing Sheets

(56)          References Cited

U.S. PATENT DOCUMENTS

| 2013/0038770 A1 | 2/2013 | Hawkins | |
| 2014/0267777 A1 | 9/2014 | Le Clerc | |
| 2016/0196756 A1* | 7/2016 | Prakash | B64U 80/25 |
| | | | 701/3 |
| 2016/0207637 A1* | 7/2016 | Campillo | B64U 80/25 |
| 2017/0161561 A1 | 6/2017 | Marty | |
| 2017/0272703 A1* | 9/2017 | Allen | H04N 7/183 |

* cited by examiner

200

202

204

SPORTS DRONE SYSTEM AND METHOD OF USE

CROSS-REFERENCE TO RELATED APPLICATION

The present application claims priority to, and the benefit of, U.S. Provisional Application No. 63/440,509, which was filed on Jan. 23, 2023, and is incorporated herein by reference in its entirety.

FIELD OF THE INVENTION

The present invention generally relates to the field of sports monitoring systems. More specifically, the present invention relates to a novel sports drone for following and monitoring golfers to record their swing videos for training and review. The drone is coupled to a mobile device for transmitting recorded videos and has rechargeable batteries which are recharged using a charging station disposed on the top surface of a golf cart. Accordingly, the present disclosure makes specific reference thereto. Nonetheless, it is to be appreciated that aspects of the present invention are also equally applicable to others like applications, devices, and methods of manufacture.

BACKGROUND

By way of background, both professional and amateur players strive to improve their performance to win more games and be more competitive. Golfers especially analyze their swing mechanics and overall gameplay to improve their swing techniques and analyze faults. Current methods of monitoring swing mechanics of a golfer require wearable patches or devices which are bulky and can affect the overall game of a player. Also, conventional video recordings of the golf course proceedings do not focus on swings of players but rather overall activities on the golf course. Golfers need a system that can allow them to review their swing mechanics in detail without using any wearable patches and devices.

In golf, it is common for players to miss important scoring events which can lead to incorrect scoring. Live recordings are not always captured, which can cause incorrect scoring. Conventionally, scorers are positioned on the important events for monitoring and scoring, however, it is not only ineffective but time consuming and expensive. People desire improved systems to provide live recordings to monitor important events in a golf game and also allow players to review their swing mechanism.

Therefore, there exists a long felt need in the art for a golf sports monitoring system that provides a live video feed to golfers. There is also a long felt need in the art for a golf drone that follows golfers to record their swing mechanics. Additionally, there is a long felt need in the art for a sports drone that captures important events such as a hole-in-one. Moreover, there is a long felt need in the art for a sports drone that provides live feeds and recordings to a mobile application for review by players. Further, there is a long felt need in the art of a golf sports monitoring system that eliminates use of wearable devices and patches for monitoring swing mechanics of a golfer. Finally, there is a long felt need in the art for a sports drone that provides livestreams and recorded videos of the golf round allowing golfers to review video for training and scoring.

The subject matter disclosed and claimed herein, in one embodiment thereof, comprises a golfer swing monitoring drone system. The drone system features a sports drone designed to track and record golfers during their play on a golf course. The sports drone includes one or more 360-degree cameras for capturing video footage of golfers during swings and special events such as a scoring event and the drone wirelessly connects with a mobile device. The mobile device has a mobile application for providing users with access to view videos recorded by the sports drone. The mobile application also provides insights and recommendations for swing improvement of the golfer based on analysis of the recorded swing of the golfer. The drone charges on a charging station positioned on a top surface of a golf cart and the drone follows a golfer to capture swing mechanics of the golfer and comes back to position on the charging station between swings for recharging the battery thereof.

In this manner, the sports drone of the present invention accomplishes all of the forgoing objectives and provides users with a drone designed to follow around (i.e., 'shadow') golfers as they play their round on a course. The drone allows golfers to obtain a live video feed of their entire round to identify swing mechanics and special events like a hole-in-one, and much more. The charging system on top of the cart prevents the drone from running out of battery in the middle of the round. The drone is wirelessly paired with a smartphone application to view livestreams and recorded videos of the golf round.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a golf player (golfer) swing monitoring and golf round event recording drone system. The drone system further comprising a sports drone and a training system. The sports drone is designed to track, livestream, and record golfers during their play on a golf course, the sports drone includes one or more 360-degree cameras for capturing video footage of golfers during swings and special events such as a scoring event, the drone connects with a mobile device, the mobile device has a mobile application for providing users with access to view videos recorded by the sports drone, the mobile application also provides insights and recommendations for swing improvement of the golfer based on analysis of the recorded swing of the golfer. The training system offers a storage platform for videos recorded by the drone and the mobile application can download data, including videos, from the training system.

In yet another embodiment, a golf drone system designed to record swings of a golf player is disclosed. The golf drone system includes a golf drone, the golf drone is positioned on a charging station disposed on a top surface of a golf cart for recharging the battery thereof, wherein the golf drone rises and maneuvers from the charging station at tee off of the golf player for recording the swing of the player, the golf drone positions back on the charging station between the shots or swings of the player for recharging the battery thereof.

In yet another embodiment, the drone is uniquely coupled to the golf cart and alternatively can be coupled to more than one golf cart.

In yet another embodiment, a sports drone for monitoring swing of a golf player and scoring events is disclosed. The sports drone includes a plurality of cameras for recording videos of a golf course, each camera can be selectively independently operable to change orientation, direction, and zoom level thereof, one or more motors disposed for propelling propellers to generate thrust and lift, thereby keeping the drone airborne, one or more rechargeable batteries to power the motors and other electronic components such as a plurality of vanes which are attached to the center of the drone. The sports drone is wirelessly coupled to a mobile device for transmitting recorded videos to a mobile application installed in the mobile device.

In yet another embodiment, the cameras employ computer vision algorithms for detecting, tracking, and pairing a golfer's position and movement during a golf round. The algorithms are configured to analyze the video feed from the cameras and identify the golfer as the primary object of interest for following the golfer during the golf round.

In yet another embodiment, a computer implemented software application including machine readable instructions for controlling and monitoring the operation of a paired sports drone is disclosed. The instructions configured a processor of a mobile device to provide a user interface that offers an "Activation" option for activating the drone, causing the drone to rise from the top of a golf cart and initiate recording of the golf course and scoring moments of a player, a "Recharging" option for providing instructions to the drone to return to the top surface of the paired golf cart for recharging the integrated battery, and a "Live Play" option for enabling the drone to record individual swings of one or more players, and when not selected, allowing the drone to record entire rounds of the golf course.

In yet another embodiment, a method for operating a sports drone in a golf course environment for recording swings of a golfer is described. The method includes the steps of detecting a shot or swing made by a golfer, moving the drone towards a paired golf cart after a first predetermined time, autonomously positioning the drone on a charging station disposed on a top of the paired golf cart for recharging the drone's battery for a second preconfigured time value, wherein the second preconfigured time value is based on the time taken by golfers between two shots, and autonomously lifting and maneuvering the drone to capture the next shot of the player upon completion of the second preconfigured time value.

In yet another embodiment, a method for operating a sports drone device in a golf course environment is disclosed. The method comprising the steps of initially positioning the drone device on a charging station of a golf cart for charging the battery of the drone device; receiving by the sports drone device, a tee-off instruction, either manually from a mobile application or autonomously from a sensor positioned on a golf club or any sensor on the golf course; initiating, by the drone device, video recording of a player's swing for review and training purposes; and capturing, by the drone device, scoring events of the golf game using the remaining one or more cameras of the drone device.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
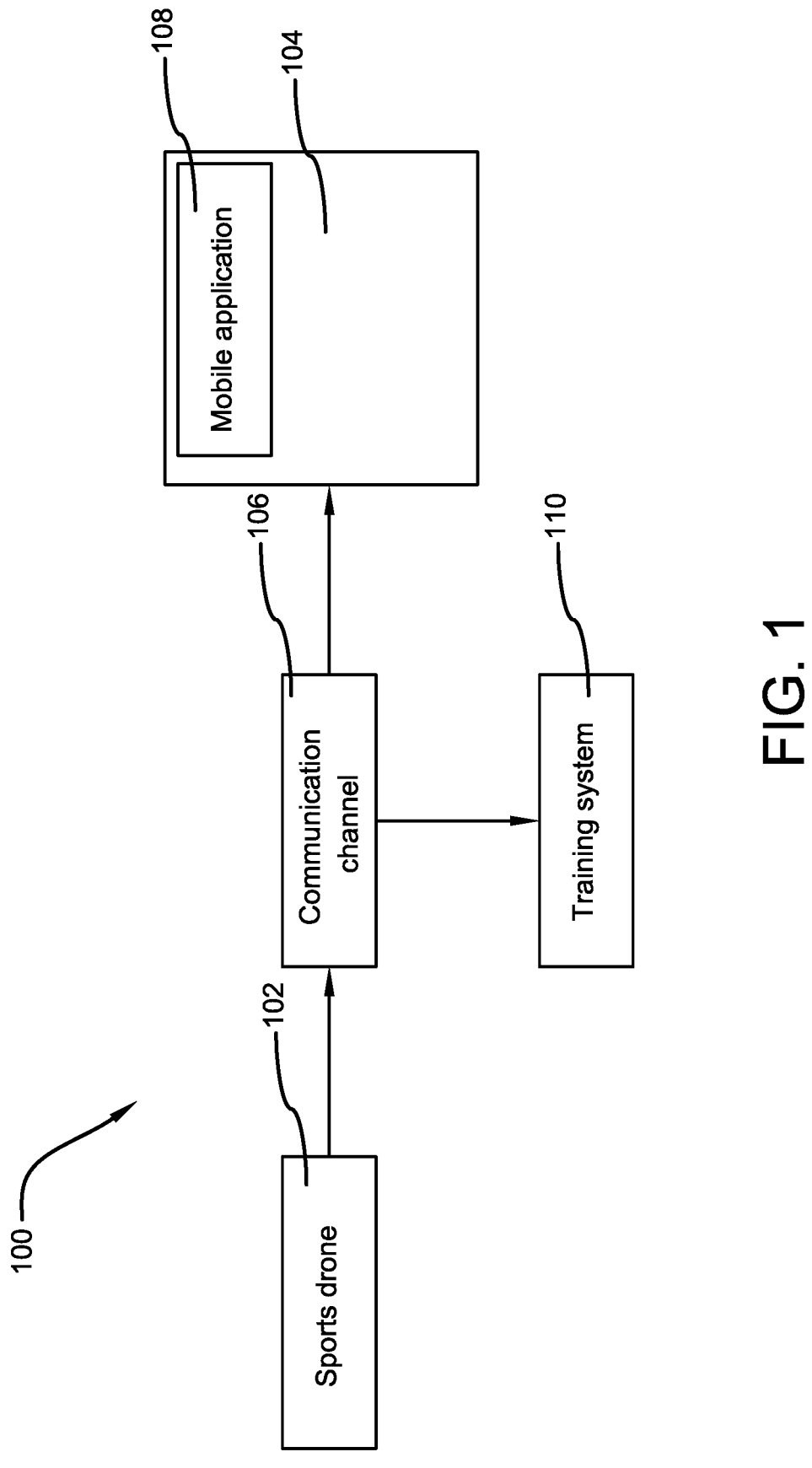
FIG. 1 illustrates a schematic view of a golf course drone monitoring system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a golf sports monitoring system that provides a live video feed to golfers. There is also a long felt need in the art for a golf drone that follows golfers to record their swing mechanics. Additionally, there is a long felt need in the art for a sports drone that captures important events such as a hole-in-one. Moreover, there is a long felt need in the art for a sports drone that provides live feed and recordings to a mobile application for review by players. Further, there is a long felt need in the art of a golf sports monitoring system that eliminates use of wearable devices and patches for monitoring swing mechanics of a golfer. Finally, there is a long felt need in the art for a sports drone that provides livestreams and recorded videos of the golf round allowing golfers to review video for training and scoring.

The present invention, in one exemplary embodiment, is a sports drone for monitoring swing of a golf player and scoring events. The sports drone includes a plurality of high-def 360-degree cameras for recording videos of a golf course, one or more motors disposed for propelling propellers to generate thrust and lift, thereby keeping the drone airborne, one or more rechargeable batteries to power the motors and other electronic components such as a plurality of vanes which are attached to the center of the drone. The sports drone is wirelessly coupled to a mobile device for transmitting recorded videos to a mobile application installed in the mobile device. The cameras employ computer vision algorithms for detecting and tracking a golfer's position and movement in the golf round. The algorithms are configured to analyze the video feed from the cameras and identify the golfer as the primary object of interest for following the golfer during a golf round.

Referring initially to the drawings, FIG. 1 illustrates a schematic view of the golf course drone monitoring system of the present invention in accordance with the disclosed architecture. The golf course drone monitoring system 100 is designed to monitor and record videos of golfers during golfing such as while making a swing allowing the golfers to review the recorded videos for identifying swing mechanics, lapse in techniques, improvement points, golf ball tracking/finding, and more. More specifically, the golf swing monitoring system 100 includes a sports drone 102 designed to follow around (i.e., 'shadow') golfers during their play on a golf course. The drone 102 includes one or more 360-degree cameras (illustrated in FIG. 3) for recording video footage of golfers during swings and special events such as a hole-in-one and more.

The drone 102 can be coupled to one or more mobile devices 104 or other similar computing devices via a wireless communication channel 106. A compatible mobile application 108 installed in the mobile device 104 provides the user with the ability to view the videos captured by the drone 102. Further, the mobile application 108 also provides insights and recommendations for improving swing to the user. The user can connect the application 108 to the drone 102 allowing a user to remotely control functions of the drone 102. The mobile device 104 can be any of a smartphone, PDA, smartwatch, laptop, tablet, and more. The communication channel 106 can be any of a Local Area Network (LAN), a Personal Area Network (PAN), a Wireless Local Area Network (WLAN), a Wireless Sensor Network (WSN), Wireless Wide Area Network (WWAN), a satellite network, Bluetooth, Wi-Fi, the Internet, an infrared (IR) network, a radio frequency (RF) network, and a combination thereof.

The drone 102 is also coupled to a training system 110 which can be a local or central server for storing videos and associated data. The stored data can be used for training purposes and can be used by golf authorities, training institutes, and more for improving the performances of their players. In some embodiments of the present invention, the mobile application 108 can download data such as videos from the training system 110. The monitoring system 100 can be used in tournaments and by players for their training.

Figure 2:
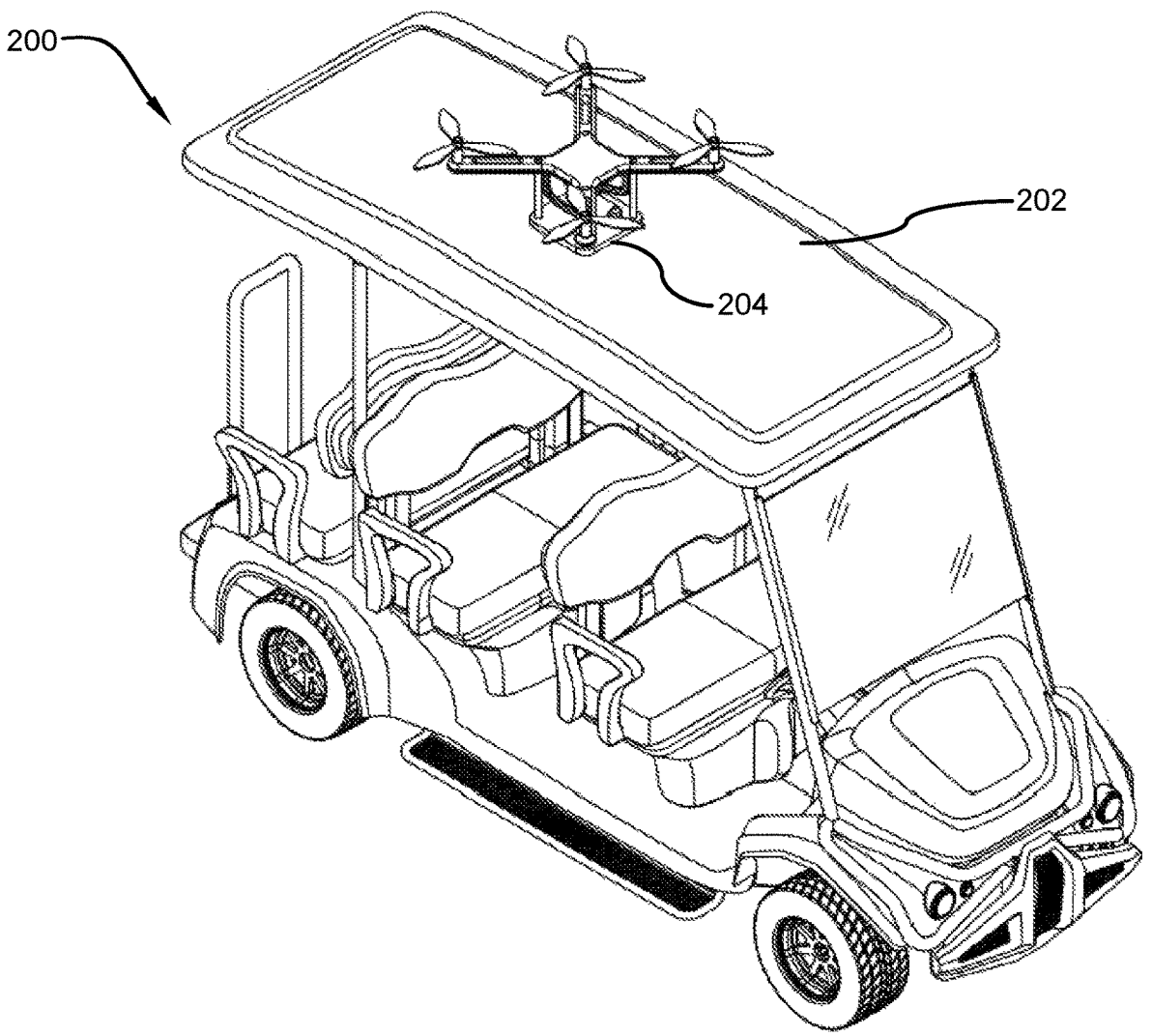
FIG. 2 illustrates a perspective view showing the position of the sports drone on the top of, or roof of, a golf cart for recharging the battery thereof in accordance with the disclosed architecture.

FIG. 2 illustrates a perspective view showing the position of the sports drone on the top of, or roof of, a golf cart for recharging the battery thereof in accordance with the disclosed architecture. The golf drone 102 is designed to be positioned on the top surface 202 of a golf cart 200 and is autonomously activated when the tracked golfer moves away from the golf cart and prepares to hit the golf ball, or alternatively, can be manually activated by a user using the mobile application 108. The mobile application 108 can provide a signal to be tracked by a transceiver in the golf drone 102 for enabling the golf drone 102 to follow, 'shadow', and hover proximal to the person carrying the mobile device 104. In this manner, the shadowing drone will undock when the tracked golfer moves away from the golf cart and then redock when the golfer moves back to the golf cart. A drone charging system 204 is disposed on the top surface 202 for charging the drone 102 when the drone 102 is positioned and docked thereto. In the preferred embodiment, the charging system 204 is a wireless charging system.

The drone 102 is equipped with a sensor to detect location of the golf cart 200 and can be recalled back to and positioned (i.e., docked) on the charging system 204 after use for recharging the battery thereof. The charging system 204 on the golf cart 200 ensures that the drone's batteries are recharged between shots or swings and prevents the drone 102 from running out of battery life during the middle of a golf round. In some embodiments of the present invention, one-to-one mapping or correlation is established between the drone 102 and the golf cart 200 ensuring that the drone 102 is coupled to a specific cart. Alternatively, in some cases, the drone 102 can be positioned and recharged on any golf cart with the drone charging system. The charging system 204 is adapted to receive electrical power from the electrical circuitry of the golf cart 200.

Figure 3:
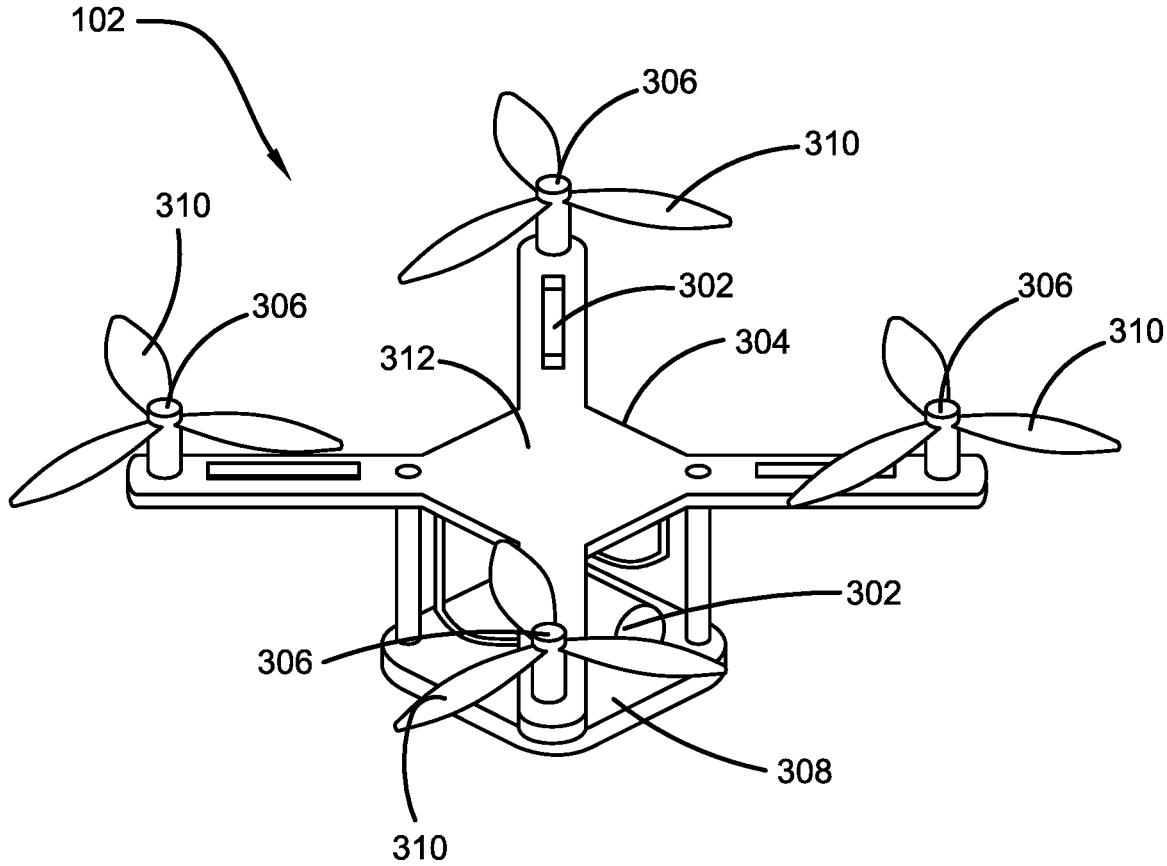
FIG. 3 illustrates a perspective view of one potential embodiment of the sports drone used in the golf course drone monitoring system of the present invention in accordance with the disclosed architecture.

FIG. 3 illustrates a perspective view of one potential embodiment of the sports drone used in the golf course drone monitoring system of the present invention in accordance with the disclosed architecture. The sports drone 102 includes a plurality of cameras 302 for recording videos of golf course wherein each of the cameras 302 can be selectively and independently operable to change the orientation, direction and zoom level thereof. One or more motors 304 are disposed for propelling the propellers 306 for generating the thrust and lift to keep the drone 102 airborne. The propellers 306 are configured to provide both clockwise and counterclockwise rotations for ensuring stability and control.

The drone 102 is preferably made of lightweight materials like carbon fiber or plastic. One or more rechargeable batteries 308 are integrated in the drone 102 for providing power to one or more motors 304 and other electronic components of the drone 102. Each battery 308 is preferably a Lithium polymer (LiPo) battery that has high energy density and lightweight properties. The batteries 308 can be mounted on the drone's frame and may be removable for easy replacement.

It should be noted that the number of motors in the drone 102 can vary depending on the shape and power of the drone 102. The drone 102 in different embodiments can have a quadcopter configuration, but other configurations like hexacopter or octocopter can also be used and include a plurality of vanes 310 for stability and support. The air vanes 310 help the drone 102 stay aloft. Each of the air vanes 310 are attached to the center 312 of the drone 102 and can use the motors 304 which can be a servo motor for rotation. The air vanes 310 can direct the air in a direction to maintain a stable hover of the drone 102.

The cameras 302 can employ computer vision algorithms for detecting and tracking a golfer's position and movement during the golf round. The algorithms are configured to analyze the video feed from the cameras 302 and identify the golfer as the primary object of interest for following the golfer during a golf round.

Figure 4:
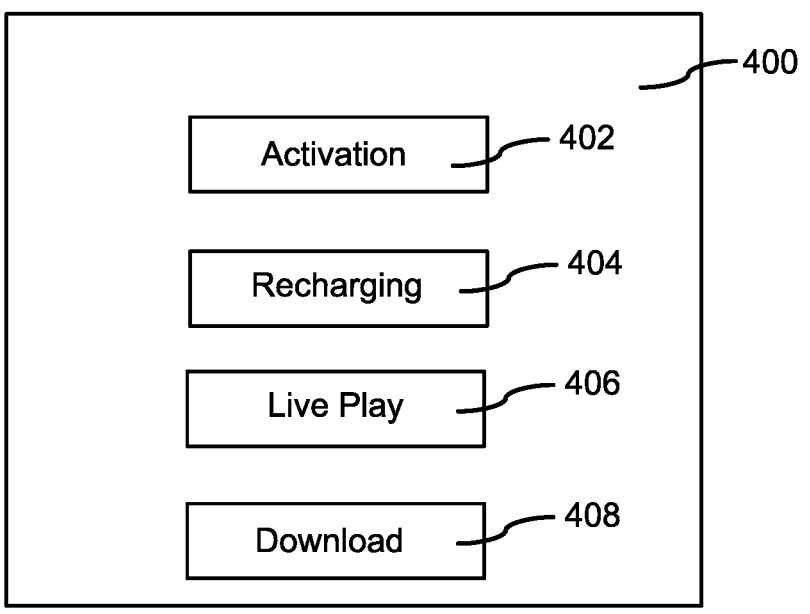
FIG. 4 illustrates an exemplary user interface displayed by the mobile application providing a plurality of options for controlling operation of the sports drone device in accordance with the disclosed architecture.

FIG. 4 illustrates an exemplary user interface displayed by the mobile application 108 providing a plurality of options for controlling operation of the sports drone device in accordance with the disclosed architecture. The mobile application 108 enables a user to control and monitor the operation of the paired sports drone 102 while also allowing the user to review the videos recorded by the sports drone 102. As illustrated, the user interface 400 provides an "Activation" option 402 for activating the drone 102. Upon activation, the drone 102 rises from the top of a golf cart and maneuvers to start recording the golf course and scoring moments of a player.

A "Recharging" option 404 provides recharging instructions to the drone 102. Accordingly, the drone 102 received instructions to come back to the top surface of the paired golf cart for recharging the integrated battery. In some embodiments, the drone 102 is autonomously positioned on the charging station 204 upon detecting low battery level. In a preferred embodiment, the drone 102 is autonomously positioned on the charging station 204 between shots or swings of a player as described in FIG. 5.

A "Live Play" option 406 enables the drone 102 to record the individual swings of one or more players. The "Live Play" option 406, when not selected, enables the drone 102 to record the entire rounds of the golf course. A "Download" option 408 enables a user to download the selected recordings from the application 108 in internal storage of the user device 104. A "Pair" option 410 allows a user to pair the application 108 with one or more sports drones. In the preferred embodiment, the application 108 can be paired with a plurality of drones and alternatively can be paired with only one drone.

Figure 5:
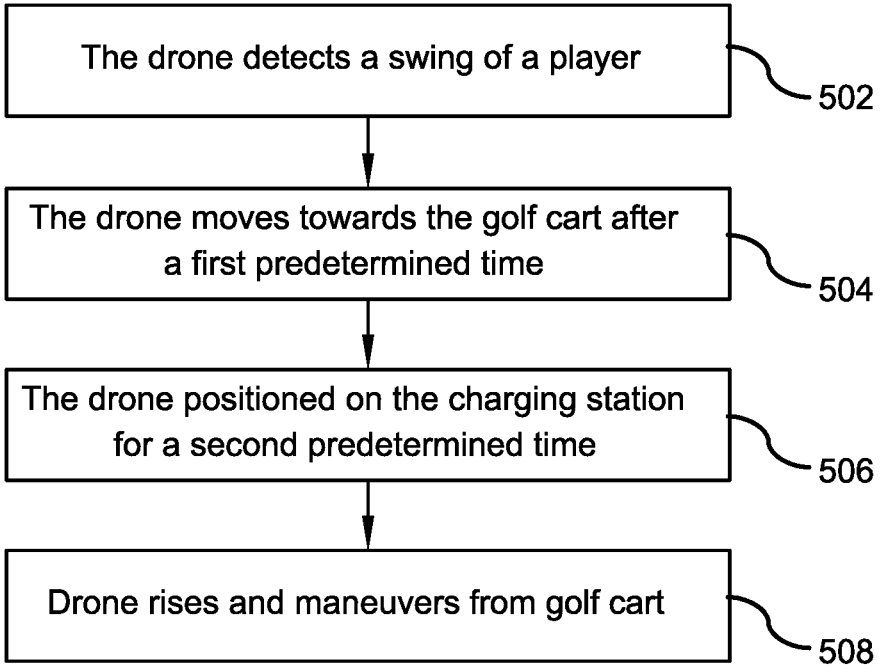
FIG. 5 illustrates a flow chart depicting a process of charging of the sports drone device for recharging batteries thereof in accordance with the disclosed architecture.

FIG. 5 illustrates a flow chart depicting a process of charging of the sports drone device for recharging batteries thereof in accordance with the disclosed architecture. Initially, the drone 102 detects a shot/swing made by a player while recording the swing and/or golf course (Step 502). The detection of the swing can be done by using an image processing algorithm used by the cameras 302 of the drone 102. Then, after a first predetermined time, such as ten seconds, the drone 102 moves towards the paired golf cart (Step 504). In some embodiments, the drone 102 can be equipped with a GPS sensor for detecting location of the golf cart and can autonomously moves towards the golf cart. Then, the drone 102 is positioned on the charging station for recharging battery of the drone 102 for a second preconfigured time value (Step 506). The second preconfigured time value can be based on time intervals commonly taken by players between sequential shots. Thereafter, upon completion of the second preconfigured time value, the drone 102 autonomously rises and maneuvers to capture the next shot of the player (Step 508).

Figure 6:
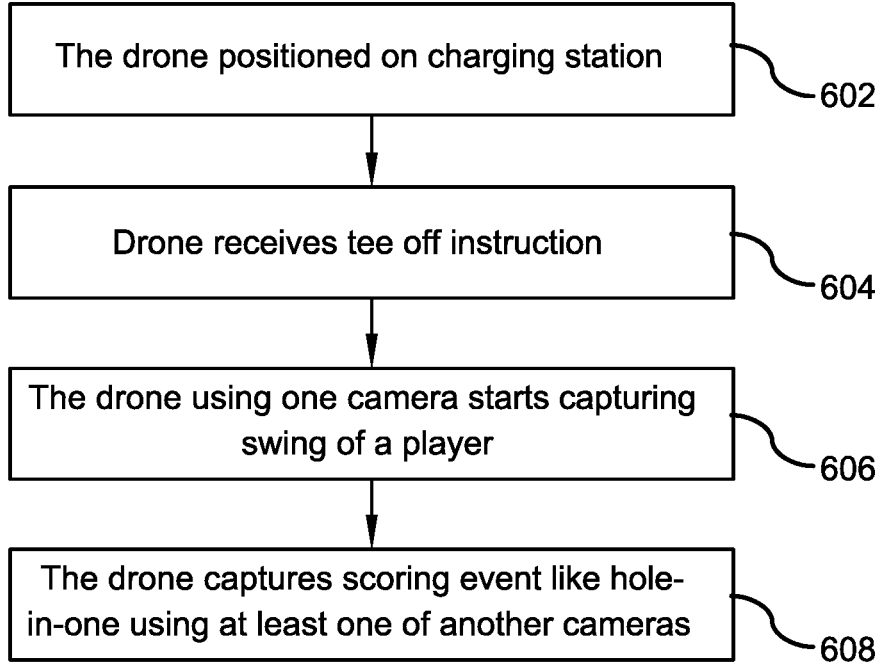
FIG. 6 illustrates a flow diagram depicting a process of activation and working of the sports drone in accordance with the disclosed architecture.

FIG. 6 illustrates a flow diagram depicting a process of activation and working of the sports drone in accordance with the disclosed architecture. Initially, the drone 102 is positioned on the charging station 204 of the golf cart 200 (Step 602). Before a game, the drone 102 remains on the charging station 204 for charging the battery thereof. Then, in step 604, the sports drone device 102 receives tee off instruction (Step 604). The instruction can manually be received from the mobile application 108 or can be autonomously received from a sensor positioned on a golf club or any sensor positioned on the golf course.

In the present embodiment, the drone device 102 starts recording video of the swing of a player for review and training purposes (Step 606). Preferably, the drone 102 captures swing using one or more but not all cameras of the drone device 102. For capturing scoring event of the golf game, one or more remaining cameras of the drone 102 is used for capturing the hole and other important events (Step 608).

In some embodiments, the drone device 102 can be configured to only capture swing mechanics of a golfer and accordingly, all the cameras of the drone 102 are used for capturing only the player and swing.

Figure 7:
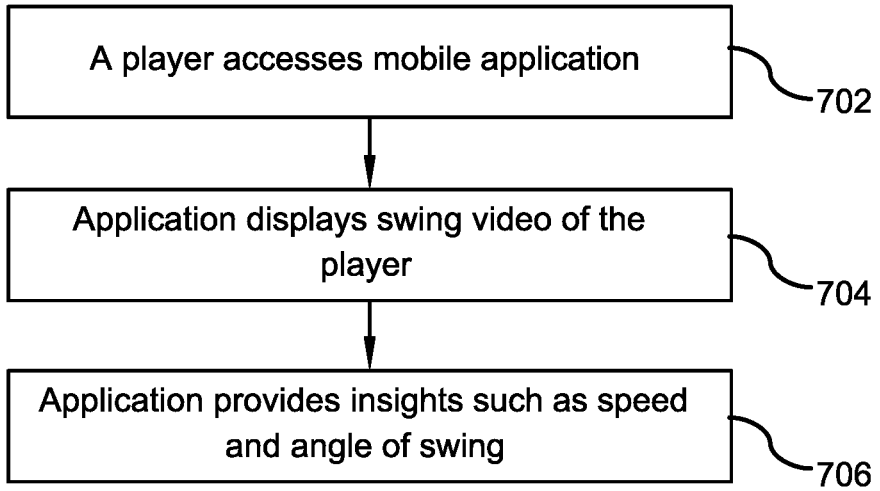
FIG. 7 illustrates a flow chart depicting a process of providing insights to a player in accordance with the disclosed architecture.

FIG. 7 illustrates a flow chart depicting a process of providing insights to a player in accordance with the disclosed architecture. Initially, a player access the mobile application to view recorded videos by a paired sports drone device (Step 702). On selection of a video, the application 108 displays the swing video of the player (Step 704). In some embodiments, the application 108 can zoom-in or zoom-out, enabling the player to view details and faults in the swing mechanism. Finally, the application 108 based on image analysis and built-in golf swing training algorithm provides insights into speed and angle of swing (Step 706), thereby allowing the player to improve their game.

Figure 8:
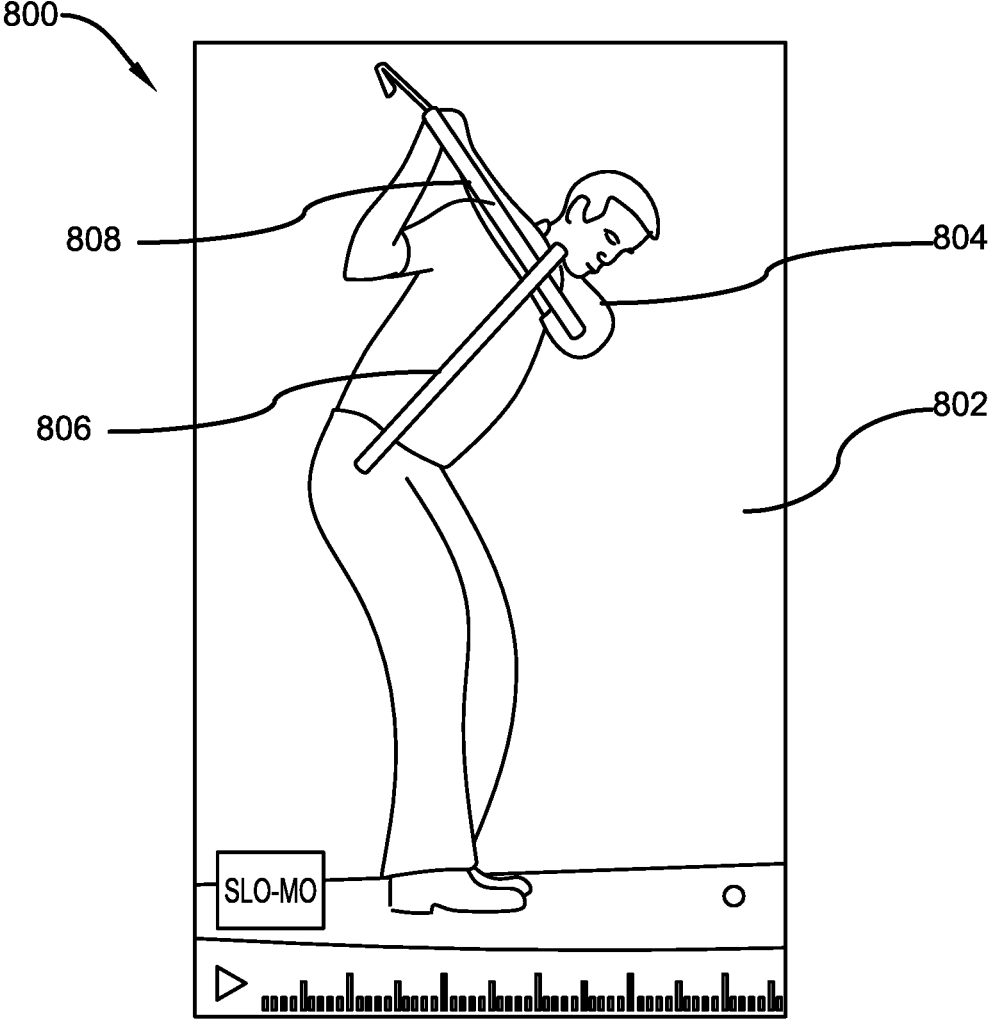
FIG. 8 illustrates an exemplary user interface of the mobile application displaying slow motion video of swing of a golfer along with swing mechanism in accordance with the disclosed architecture.

FIG. 8 illustrates an exemplary user interface of the mobile application displaying slow motion video of a swing of a golfer along with swing mechanism in accordance with the disclosed architecture. The user interface 800 displays a slow-motion video 802 of swing of a golfer 804. The video 802 can be played without slow motion and can be forwarded or replayed as well. The video 802 displays body movement 806 and swing movement 808 of the golfer 804 for allowing the golfer 804 to review the swing mechanism to improve the golf game.

Figure 9:
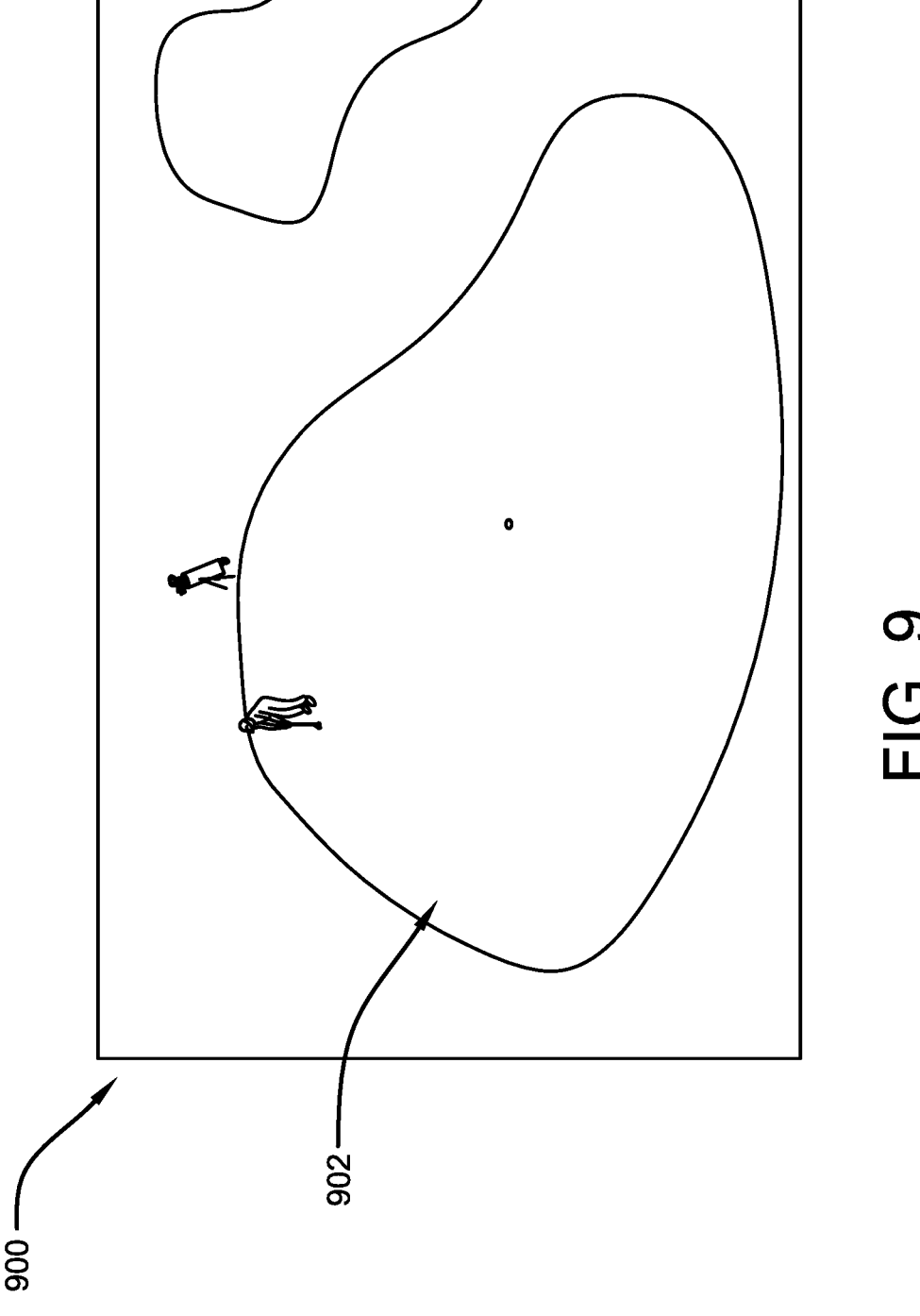
FIG. 9 illustrates another exemplary user interface displaying video of a complete golf field in accordance with the disclosed architecture.

FIG. 9 illustrates another exemplary user interface displaying video of a complete golf field in accordance with the disclosed architecture. In the present embodiment, the interface 900 displays a complete bird-eye view of the playing area of a golf course 902 for completely capturing all activities and milestones in a game. The birds-eye view can be selected by a player using one or more options provided by the application 108.

Figure 10:
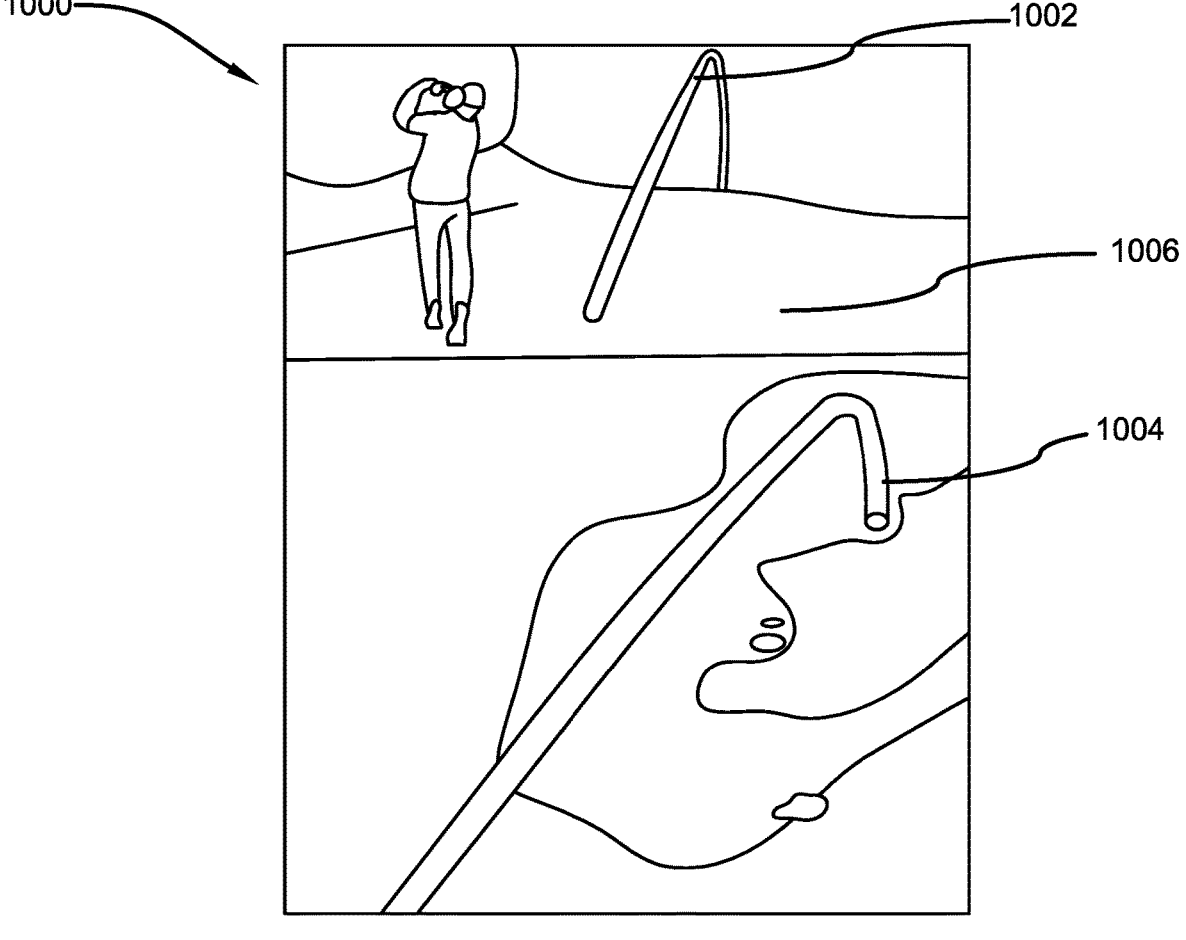
FIG. 10 illustrates yet another user interface displayed by the mobile application for swing speed analysis in accordance with the disclosed architecture.

FIG. 10 illustrates yet another user interface displayed by the mobile application for swing speed analysis in accordance with the disclosed architecture. As illustrated, the interface 1000 displays the ball or shot height 1002, ball or shot distance 1004, and ball or shot speed 1006 for enabling a player to review the swing mechanism.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "golf course drone monitoring system", "golf swing monitoring system", and "monitoring system" are interchangeable and refer to the golf swing monitoring system 100 of the present invention.

Similarly, as used herein "sports drone device", "drone device", and "drone" are interchangeable and refer to the golf drone device 102 of the present invention.

Notwithstanding the forgoing, the golf swing monitoring system 100 and the golf drone device 102 of the present invention can be of any suitable size and configuration as is known in the art without affecting the overall concept of the invention. One of ordinary skill in the art will appreciate that the golf swing monitoring system 100 and the golf drone device 102 as shown in the FIGS. are for illustrative purposes only, and that many other sizes and shapes of the golf swing monitoring system 100 and the golf drone device 102 are well within the scope of the present disclosure. Although the dimensions of the golf swing monitoring system 100 and the golf drone device 102 are important design parameters for user convenience, the golf swing monitoring system 100 and the golf drone device 102 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A golfer drone monitoring system comprising:
a drone;
a golf cart;
a charger;
a mobile application; and
a mobile device;
wherein said golf drone having at least one camera for recording video of the golfer;
wherein said mobile device having said mobile application integrated thereto;
wherein said golf drone is paired to said mobile device for transmitting video over a wireless channel;
wherein said mobile application having a playback feature for viewing said recorded video on said mobile device;
wherein said mobile application having remote control functions for controlling said golf drone;
wherein said charger is mounted to a roof of the golf cart for wirelessly recharging batteries of said golf drone during a round of golf;
wherein the at least one camera is a 360 degree camera; and further wherein the mobile application is configured to display a shot height, a shot distance, and a shot speed from a captured golf swing.

2. The golfer drone monitoring system of claim 1, wherein said mobile application transmits a signal to be tracked by a transceiver in said golf drone for said pairing of said golf drone to said mobile device.

3. The golfer drone monitoring system of claim 2, wherein said golf drone autonomously activates, undocks, and hovers proximal to the golfer when the golfer and said mobile device move away from the golf cart.

4. The golfer drone monitoring system of claim 3, wherein said golf drone having a connection to a training system for storing said recorded video.

5. The golfer drone monitoring system of claim 4, wherein said connection comprises a local server or a central server.

6. The golfer drone monitoring system of claim 3, wherein said recorded video reviewable by the golfer for identifying swing mechanics, a lapse in techniques, improvement points, and a golf ball tracking.

7. The golfer drone monitoring system of claim 6, wherein said mobile device is selected from a group consisting of a smartphone, a PDA, a smartwatch, a laptop, and a tablet.

8. The golfer drone monitoring system of claim 2, wherein said golf drone is manually activated to hover proximal to the golfer when the golfer and said mobile device move away from the golf cart.

9. The golfer drone monitoring system of claim 3, wherein said golf drone having a plurality of cameras for recording videos of the golfer and a golf course, and further wherein each of said plurality of cameras selectively and independently operable to change an orientation, a direction, and a zoom level.

10. The golfer drone monitoring system of claim 9, wherein said golf drone having a sensor for detecting location of the golf cart and redocking to said charger.

11. A method of drone monitoring a golfer, the method comprising the steps of:
providing a golfer monitoring system having a drone, a golf cart, a wireless charger, a mobile application, and a mobile device, wherein said golf drone having at least one camera for recording video of the golfer;
integrating said mobile application with said mobile device;
pairing said golf drone to said mobile device for transmitting video over a wireless channel;
actuating a playback feature with said mobile application for viewing said recorded video on said mobile device;
controlling said golf drone with said mobile application having remote control functions;
transmitting a signal from said mobile application to be tracked by a transceiver in said golf drone for said pairing of said golf drone to said mobile device;
autonomously activating, undocking, and hovering said golf drone proximal to the golfer when the golfer and said mobile device move away from the golf cart;
and further wherein the mobile application is configured to display a shot height, a shot distance, and a shot speed from a captured golf swing
wherein the at least one camera is a 360 degree camera; and
further wherein the mobile application is configured to display a slow-motion video of a captured golf swing.

12. The method of drone monitoring a golfer of claim 11 further comprising the steps of: docking said golf drone with said charger; and recharging batteries of said golf drone with said wireless charger mounted to the golf cart.

13. The method of drone monitoring a golfer of claim 12 further comprising a step of detecting a location of the golf cart with a sensor in said golf drone for recalling said golf drone back to said charger.

14. The method of drone monitoring a golfer of claim 13 further comprising a step of autonomously docking said golf drone upon detection of low battery level.

15. The method of drone monitoring a golfer of claim 13 further comprising a step of autonomously docking said golf drone between shots of the golfer.

16. A method of drone monitoring a golfer, the method comprising the steps of:

providing a golfer monitoring system having a drone, a golf cart, a wireless charger, a mobile application, and a mobile device, wherein said golf drone having a plurality of cameras for recording videos of the golfer, a golf course, and a golf ball, and further wherein each of said plurality of cameras selectively and independently operable to change an orientation, a direction, and a zoom level;

integrating said mobile application with said mobile device;

pairing said golf drone to said mobile device for transmitting said recorded videos over a wireless channel;

actuating a playback feature with said mobile application for viewing said recorded videos on said mobile device;

controlling said golf drone with said mobile application having remote control functions;

and further wherein the mobile application is configured to display a shot height, a shot distance, and a shot speed from a captured golf swing wherein the at least one camera is a 360 degree camera; and further wherein the mobile application is configured to provide a signal trackable by the golf drone that allows the golf drone to follow and hover proximal to the golfer when the golfer and the mobile device move away from the golf cart.

17. The method of drone monitoring a golfer of claim 16 further comprising the steps of: docking said golf drone with said charger; and recharging batteries of said golf drone with said wireless charger mounted to the golf cart.

18. The method of drone monitoring a golfer of claim 17 further comprising the steps of:

detecting a location of the golf cart with a sensor in said golf drone for recalling said golf drone back to said charger; and transmitting a signal from said mobile application to be tracked by a transceiver in said golf drone for said pairing of said golf drone to said mobile device.

19. The method of drone monitoring a golfer of claim 18 further comprising a step of autonomously said docking of said golf drone upon detection of low battery level.

\* \* \* \* \*